United States Patent
Adler et al.

(10) Patent No.: US 10,977,367 B1
(45) Date of Patent: Apr. 13, 2021

(54) DETECTING MALICIOUS FIRMWARE MODIFICATION

(71) Applicant: Facebook, Inc., Menlo Park, CA (US)

(72) Inventors: B. Thomas Adler, Sunnyvale, CA (US); Sahil Rihan, Menlo Park, CA (US); Srishti Srivastava, Morganville, NJ (US)

(73) Assignee: Facebook, Inc., Menlo Park, CA (US)

( * ) Notice: Subject to any disclaimer, the term of this patent is extended or adjusted under 35 U.S.C. 154(b) by 552 days.

(21) Appl. No.: 15/890,042

(22) Filed: Feb. 6, 2018

(51) Int. Cl.
*G06F 21/56* (2013.01)
*G06N 20/00* (2019.01)

(52) U.S. Cl.
CPC .......... *G06F 21/563* (2013.01); *G06F 21/568* (2013.01); *G06N 20/00* (2019.01)

(58) Field of Classification Search
CPC ...... G06F 21/563; G06F 21/568; G06N 20/00
See application file for complete search history.

(56) References Cited

U.S. PATENT DOCUMENTS

| | | | | |
|---|---|---|---|---|
| 7,539,868 | B2* | 5/2009 | Balard ................. | G06F 21/10 713/175 |
| 10,063,445 | B1* | 8/2018 | Preece ................. | H04L 43/10 |
| 2005/0021968 | A1* | 1/2005 | Zimmer ............... | G06F 21/572 713/176 |
| 2006/0107032 | A1* | 5/2006 | Paaske ................. | G06F 21/57 713/2 |
| 2012/0254624 | A1* | 10/2012 | Malkhasyan ......... | G06F 21/572 713/189 |
| 2013/0185564 | A1* | 7/2013 | Jaber ................... | G06F 21/572 713/176 |
| 2014/0281501 | A1* | 9/2014 | Korkishko ........... | G06F 12/1408 713/156 |
| 2014/0304520 | A1* | 10/2014 | Bobzin ................ | G06F 21/572 713/187 |
| 2016/0378990 | A1* | 12/2016 | Goodman ............. | G06F 21/64 726/19 |
| 2017/0003956 | A1* | 1/2017 | Chang ................. | G06F 8/658 |
| 2017/0085383 | A1* | 3/2017 | Rao .................... | G06F 8/654 |
| 2018/0018663 | A1* | 1/2018 | Van .................... | H04L 9/3263 |
| 2018/0075241 | A1* | 3/2018 | Gomez ................ | G06F 8/654 |
| 2020/0014705 | A1* | 1/2020 | Cui ..................... | G06F 21/64 |
| 2020/0226903 | A1* | 7/2020 | Lewis ................. | G08B 21/182 |

* cited by examiner

*Primary Examiner* — Samson B Lemma
*Assistant Examiner* — Abdullah Almamun
(74) *Attorney, Agent, or Firm* — Van Pelt, Yi & James LLP

(57) ABSTRACT

It is determined whether an installed firmware of a device matches a reference firmware for the device. In response to a determination that the installed firmware of the device does not match the reference firmware for the device, different types of content sections of the installed firmware of the device are extracted. At least one of the content sections is identified as a dynamic section. A portion of the installed firmware selected to exclude at least the dynamic section is compared with a corresponding portion of the reference firmware to determine a comparison result. A security action is performed based at least in part on the comparison result.

20 Claims, 5 Drawing Sheets

DETECTING MALICIOUS FIRMWARE MODIFICATION

BACKGROUND OF THE INVENTION

BIOS (i.e., Basic Input/Output System) is firmware that initializes hardware during the booting process and provides runtime services for operating systems and programs. Typically the BIOS firmware is pre-installed on the system board of a machine such as a personal computer, and is the first software run when the machine is powered on. The BIOS firmware interfaces with various machines that make up the complementary system chipset of a computer. BIOS firmware is able to be modified. While this facilitates updates to be performed more easily to the BIOS firmware, it also opens the system to be compromised and the computer may become infected with a hacked BIOS designed to cause harm or provide unauthorized access.

BRIEF DESCRIPTION OF THE DRAWINGS

Various embodiments of the invention are disclosed in the following detailed description and the accompanying drawings.

DETAILED DESCRIPTION

Figure 1:
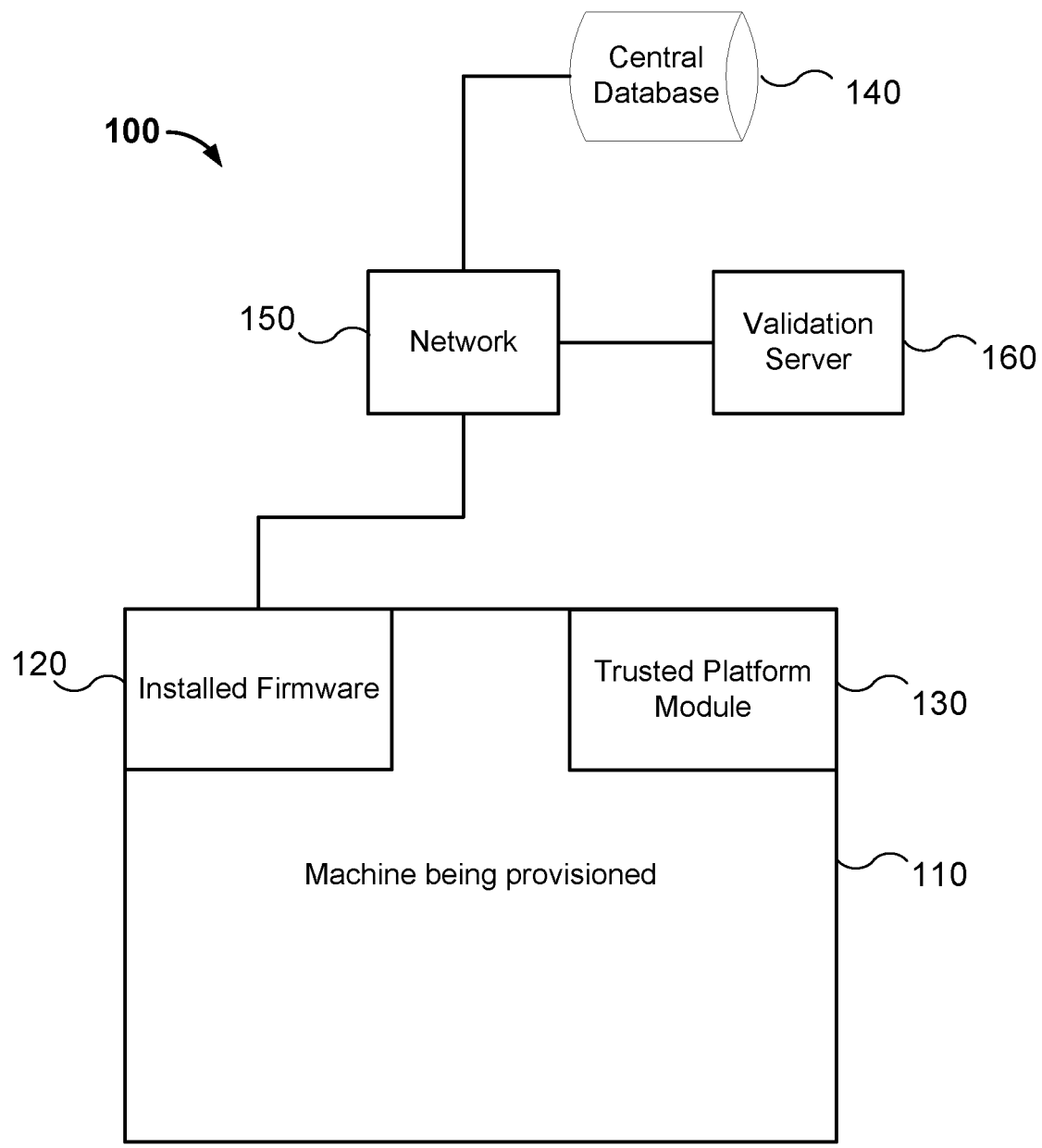
FIG. 1 is a block diagram depicting components of a system for detecting malicious firmware modification.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique is disclosed for automating the extraction and initial analysis of installed firmware such as a BIOS that may have been be compromised or tampered with to cause harm to the server or system on which it has been installed. In particular, the technique can be used to differentiate harmless changes to the installed firmware or BIOS from changes that indicate a real hacking attack, requiring further investigation as to the source of the attack to stop future attacks. More specifically, the technique identifies changes in the installed firmware that are indicative of possible attacks through malicious modifications of the installed firmware's code. A BIOS detected as having a change indicative of possible malicious activity can be identified, stored, and reported for further investigation including a deeper, manual analysis by a BIOS security expert.

The technique makes use of prior knowledge of the different types of content sections in installed firmware such as a BIOS. For example, a BIOS has data settings that are configurable and dynamic, such as settings for the time, date, or other configurable settings that can change over time. A firmware/BIOS also has static sections such as program code sections that control the execution of functions and other operations performed by the BIOS such as initializing hardware during the booting process and providing runtime services for operating systems and programs. Because certain changes, for example to the data settings or due to random bit flips (e.g., changes to content stored in memory/storage that caused by noise, radiation, memory error, hardware limitation, etc.), are innocuous and do not indicate malicious activity, an approach that identifies any change in a firmware/BIOS as a malicious attack will result in false positives. In this case, false positives are determinations that the detected change in the firmware/BIOS is due to a malicious modification when in fact the change is innocuous thus triggering a false alarm. Accordingly, to target only the firmware/BIOS changes that are indicative of malicious activity and limit the number of false positives, a mechanism for detecting tampering of the firmware/BIOS as described herein focuses on detecting changes only to the static code sections and not to the dynamic data settings which are known and expected to be constantly changing over time.

The technique triages reporting on the firmware by identifying firmware that might have been subject to malicious modifications rather than reporting on every firmware detected to have changed from a reference firmware that is known to be uncorrupted. The approach classifies errors for further investigation by distinguishing between a real threat (i.e., an attack on the firmware code) and an innocuous difference caused by a change in firmware data settings (e.g., a difference in time or boot sequence). The technique provides a metric of how urgent a manual analysis is for detecting malicious modifications at the firmware level, reserving the reporting of firmware to only those cases that warrant the time and resources for further investigation. This automated system improves and makes more efficient the process of detecting malicious modifications to installed firmware such as a BIOS.

FIG. 1 is a block diagram depicting components of a system 100 for detecting malicious firmware modification. In some embodiments, an initial in-memory operating system is first installed on a machine to be deployed, shown in FIG. 1 as Machine being provisioned 110. The initial operating system includes code to determine whether an Installed Firmware 120 (e.g., a BIOS) matches a reference firmware, for example as an initial validation check, by comparing a signature from Installed Firmware 120 to a reference signature (i.e. a signature from a reference firmware).

In some embodiments, the code that determines whether the installed firmware matches the reference firmware in the in-memory operating system computes a check sum or hash of Installed Firmware 120 (e.g., a hash of the BIOS), which serves as the signature from Installed Firmware 120. The in-memory operating system running the code that determines whether the installed firmware matches the reference firmware also obtains a reference signature from a reference firmware. In some embodiments, the reference firmware (e.g., reference BIOS) is an uncorrupted version of Installed Firmware 120 provided by a manufacturer of Installed Firmware 120. In some embodiments, the signature of the reference firmware is a reference hash value or golden value provided by the manufacturer of Installed Firmware 120. In other embodiments, the code that determines whether the installed firmware matches the reference firmware downloads a reference copy (e.g., a reference BIOS) of Installed Firmware 120 from a remote server such as Validation Server 160 through Network 150 and calculates the golden value (i.e., the reference signature) using the downloaded reference copy of Installed Firmware 120. In other embodiments, the reference copy (e.g., a reference BIOS) of Installed Firmware 120 is obtained from a local storage (e.g., the reference copy is installed to the disk on the machine during a provisioning process). In the example shown, the reference signature is a reference hash value or golden value calculated by the code in the initial in-memory operating system and stored in a database. In both cases, the golden values provided by the manufacturer or calculated by the code in the initial in-memory operating system can be stored in a database such as Central Database 140 and can be accessed by the code that determines whether the installed firmware matches the reference firmware through Network 150.

In some embodiments, instead of computing the check sum or hash of Installed Firmware 120 (e.g., a hash of the BIOS) to obtain the signature of Installed Firmware 120, the signature of Installed Firmware 120 is obtained instead from a Trusted Platform Module or TPM 130. In the example of FIG. 1, a TPM chip 130 is shown as installed on Machine 110, but the TPM technology used by system 100 may be implemented in other ways such as in TPM firmware. TPM chip 130 calculates the check sum value or hash value of Installed Firmware 120 (e.g., the BIOS) and writes it to a register (e.g., Platform Configuration Register 0) on TPM chip 130. Thus, Platform Configuration Register 0 (i.e., PCR0) of TPM chip 130 holds the check sum value or hash value of Installed Firmware 120, which can be read by the code that determines whether the installed firmware matches the reference firmware. In this case, the PCR0 value serves as the signature of Installed Firmware 120 and is compared against the golden value (i.e., the reference signature) obtained from Central Database 140 via Network 150.

Figure 2:
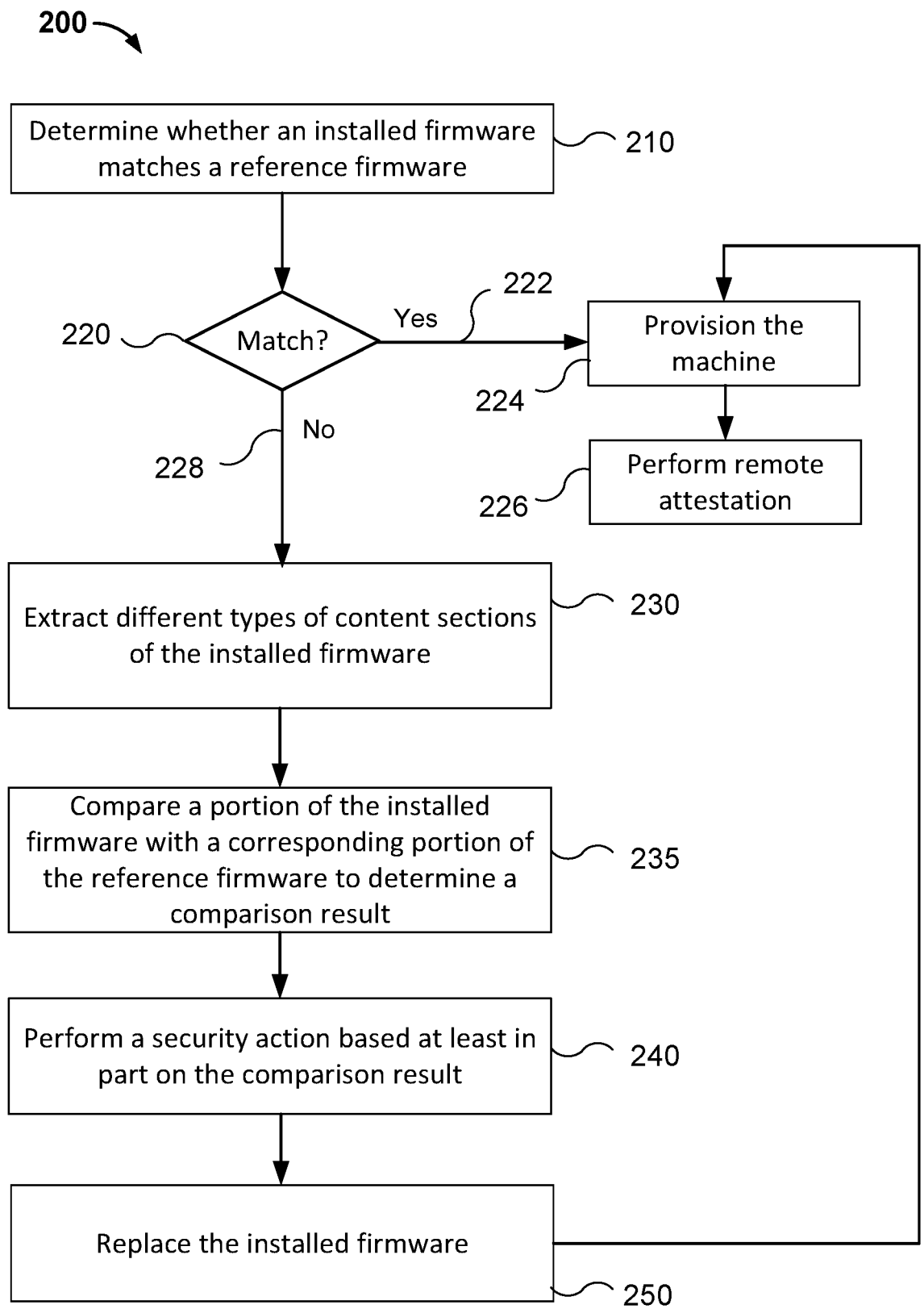
FIG. 2 is a flowchart illustrating an embodiment of a process for detecting malicious firmware modification.

FIG. 2 is a flowchart illustrating an embodiment of a process for detecting malicious firmware modification. The process 200 shown in FIG. 2 can be used to automate the detection, diagnosis, and performance of remedial security actions to address tampering and attacks directed to preinstalled firmware including BIOSs and UEFIs (Unified Extensible Firmware Interfaces). Additionally, the technique described herein provides an approach that can assist in detecting tampering with firmware code to aid in taking informed remedial security measures.

An initial in-memory operating system installed on a machine being provisioned includes code to perform an initial validation check on Installed Firmware 120. In some embodiments, the process determines whether an installed firmware matches a reference firmware at 210. If at 220 a match is determined, at 222, the process proceeds to provision the machine at 224. Provisioning the machine at 224 may include: installing the machine's operating system, installing applications, installing/initializing services and configurations, and/or performing other actions needed for the machine to function in deployment.

After the machine is provisioned at 224, the process performs remote attestation at 226. Remote attestation is a method by which a host or client can authenticate its hardware and software configuration to a remote host or server. The remote attestation process will ensure that the PCR0 value read from the TPM chip is correct by passing signed messages (e.g., secured using security keys) back and forth to make sure the correct value is received. If the remote attestation process is successful, the machine is deployed, put into use, or put into production. If the remote attestation process fails, a security action is performed. For example, the machine is prevented from being deployed and the firmware is uploaded or stored and a report is generated to indicate that further analysis or investigation is needed.

Figure 3:
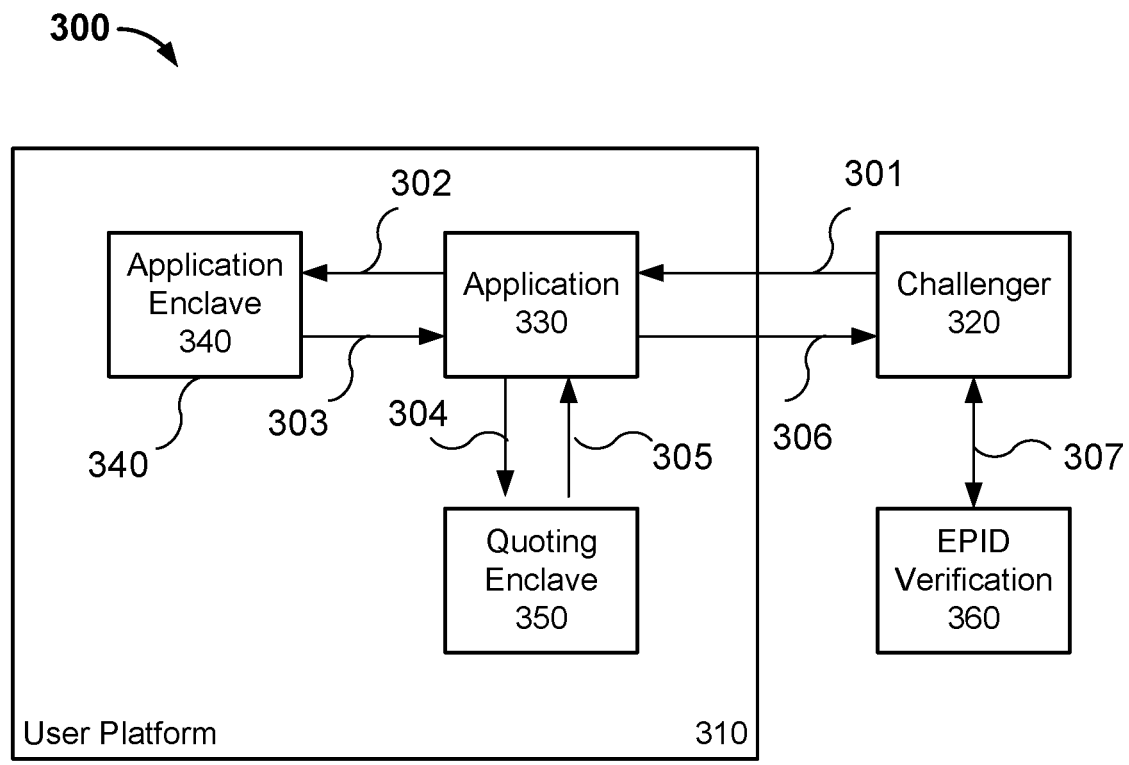
FIG. 3 is a block diagram showing an example of the basic steps involved in remote attestation.

FIG. 3 is a block diagram showing an example of the basic steps involved in remote attestation. In particular, FIG. 3 shows how an application provides attestation to a challenging service provider to receive some value added service from the provider. The remote attestation shown in FIG. 3 is merely an example and other remote attestation may be utilized in various other embodiments.

As shown in the block diagram 300 of FIG. 3, when Application 330 needs a service from outside User Platform 310, it first establishes communication at 301 with a service providing system or service provider (not shown). The service provider issues a challenge through Service Challenger 320 to Application 330 to demonstrate or confirm that the service provider is running the necessary components of itself inside one or more enclaves. The challenge itself contains a nonce for liveness purposes. At 302, Application 330 requests a report from Application Enclave 340 and passes in the nonce contained in the challenge. At 303, Application Enclave 340 generates a report structure and returns this report structure along with a manifest to Application 330. The manifest contains those values that are included in the user data portion of the report and may include the nonce and an ephemerally generated public key to be used by the challenger for communicating secrets back to the enclave. At 304, the report is delivered to Quoting Enclave 350 for signing. Quoting Enclave 350 authenticates the report and converts the body of the report into a quote and signs it with the security key. At 305, Quoting Enclave 350 returns the quote structure requested to Application 330. At 306, Application 330 returns the quote structure and any associated manifest of supporting data to Service Challenger 320. At 307, Service Challenger 320 uses the security public key certificate to validate the signature over the quote or may optionally choose to use a security verification service to perform this function. In particular, Service Challenger 320 compares the enclave information in the quote against a trusted configuration and only renders the service to Application 330 if the enclave information matches the trusted configuration. Service Challenger 320 might enforce different trust policies, for example, only trusting a specific version of an enclave, identified by the measurement of the code and data in the enclave, or trusting all enclaves with a specific Product ID from a specific enclave author, identified by the hash of the public key in the security certificate. A trust policy must include enclave authorship and attributes checks. The steps described above serve as an example to illustrate one possible way that an enclave can be attested by a remote entity in a remote attestation process. The trusted configuration mentioned above is typically provided by the enclave author to the service provider. The mechanism for the service provider to acquire the trusted configuration is out of the scope of the remote attestation. One possible mechanism is that the service provider utilizes the existing public key infrastructure to verify the identity of the entity providing the trusted configuration information before accepting the trusted configuration information.

In response to a determination that the installed firmware of the device does not match the reference firmware for the device at 228, the process extracts different types of content sections of the installed firmware of the device at 230. In some embodiments, at least one of the content sections is identified as a dynamic section. The process compares a portion of the installed firmware to a corresponding portion of the reference firmware at 235. In some embodiments, the installed firmware is a BIOS, shown as Installed Firmware 120 in FIG. 1, and the reference firmware is an uncorrupted version of Installed Firmware 120 (e.g., a golden reference BIOS) provided by a manufacturer of Installed Firmware 120. The process 200 proceeds at step 240 to perform a security action in response to the comparison of the installed firmware to the reference firmware. After a security action is performed at 240, the installed firmware is replaced (e.g., ROM storing the installed firmware is re-flashed using the reference firmware) at step 250.

The process provisions the machine at 224 by installing the main operating system for the machine by performing other provisioning including installing applications, services, and configurations needed for the machine to be deployed. Next, remote attestation is performed at step 226 according to the steps described with respect to FIG. 3. If remote attestation fails, the installed firmware is reported for further investigation and additional security action (not shown). If remote attestation succeeds, the machine is deployed or placed in production (not shown).

Figure 4:
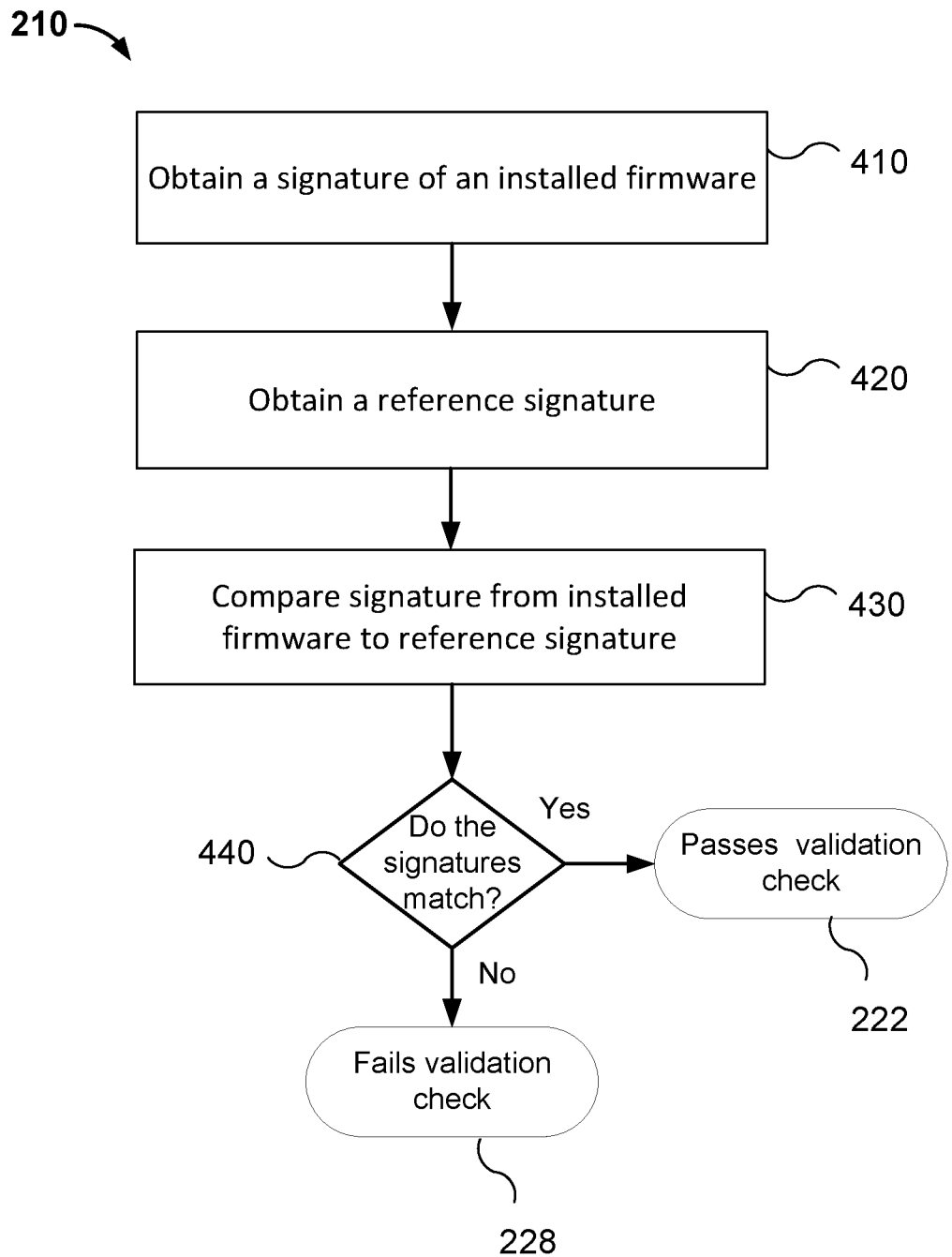
FIG. 4 is a flowchart illustrating additional steps in an exemplary embodiment of a signature matching process to determine whether an installed firmware matches a reference firmware.

FIG. 4 is a flowchart illustrating additional steps in an exemplary embodiment of a firmware matching process 210 which can be used to perform an initial validation check on the installed firmware. The process 210 may be performed by code in the initial in-memory operating system on the machine being provisioned (e.g., Machine 110 of FIG. 1). Alternatively, in some embodiments, the process 210 is performed remotely, by passing values back and forth from a remote analysis server such as Validation Server 160 of FIG. 1. For example, a service can determine whether the installed firmware matches the reference firmware by requesting a signature of the installed firmware or BIOS and comparing the signature of the installed firmware to a reference signature obtained remotely from a database.

As shown in FIG. 4, determining whether an installed firmware matches a reference firmware at 210 can include determining whether a signature of the installed firmware (e.g., Installed Firmware 120 of FIG. 1) matches a reference signature. To perform this determination, the process obtains a signature of the installed firmware at 410, obtains a reference signature at 420, and compares the signature from the installed firmware to the reference signature at 430. The process then determines whether the signatures match at 440. If the signatures match (pass the validation check) at 222 and the process proceeds as described with respect to FIG. 2 by provisioning the machine at 224 and performing remote attestation at 226. If the signatures do not match (fail the validation check) at 228, the process proceeds as described with respect to FIG. 2 by extracting different types of content sections of the installed firmware at 230 and comparing a portion of the installed firmware with a corresponding portion of the reference firmware at 235, performing a security action at 240, re-flashing the installed firmware at 250, and then provisioning the machine at 224 and performing remote attestation at 226.

In some embodiments, determining whether the installed firmware matches the reference firmware is performed by code in the initial in-memory operating system installed on the machine being provisioned (e.g., Machine 110 of FIG. 1). The code computes a check sum or hash of the installed firmware (e.g., a hash of the BIOS), which serves as the signature from the installed firmware. This signature from the installed firmware is requested by the process 210 at step 410.

In some embodiments, the reference signature is a golden value corresponding to a hash of a reference firmware. The reference firmware is a version of the installed firmware that has not been compromised such that when a hash function is applied, the result is a valid or trusted hash value corresponding to an uncorrupted version of the installed firmware (e.g., a golden BIOS) provided by a manufacturer of the installed firmware. In some embodiments, the signature of the reference firmware is a reference hash value or golden value provided by the manufacturer of the installed firmware.

In other embodiments, the code that determines whether the installed firmware matches the reference firmware downloads a reference copy (e.g., golden reference BIOS) of the installed firmware from a remote server and calculates the golden value (i.e., the reference signature) using the downloaded reference copy of installed firmware. In these embodiments, the reference signature is a reference hash value or golden value calculated by the code in the initial in-memory operating system and stored in a database. In both cases, the golden values provided by the manufacturer or calculated by the code in the initial in-memory operating system can be stored in a database such as Central Database 140 and can be accessed by the code that determines whether the installed firmware matches the reference firmware through Network 150 of FIG. 1. Thus, as shown in FIG. 4, the code that determines whether the installed firmware matches the reference firmware can obtain a reference signature at 420 from a database that stores the golden values, which may be provided by the manufacturer of the installed software or pre-computed and stored by the code in the initial in-memory operating system. After obtaining the reference signature at 420, the code that determines whether the installed firmware matches the reference firmware compares this reference signature to the signature from the installed firmware at 430 and determines whether the two signatures match at 440.

In some embodiments, determining whether the installed firmware matches the reference firmware is performed on firmware installed on a machine being provisioned by a process 210, as depicted in FIG. 4, by code installed in an initial in-memory operating system of the machine. In some cases, the installed firmware is an installed BIOS and the hash of the installed BIOS includes a hash value obtained from a Platform Configuration Register number 0 or PCR0 value of a TPM chip that computes and stores the hash of the installed BIOS program/code. In this case, the valid hash value corresponding to the hash of the reference firmware is a hash comprising a golden hash value for a version of the BIOS that has not been compromised. The golden hash value can be provided by the manufacture of the BIOS or it can be pre-calculated by the code installed in the initial in-memory operation system on a reference copy of the BIOS (i.e., a golden BIOS provided by the manufacturer of the BIOS). The golden hash values can be stored in a database such as the Central Database 140 of FIG. 1, and can be accessed via a network, such as Network 150 of FIG. 1.

In some embodiments, the hash value for the installed BIOS is obtained directly from the kernel or installed BIOS and does not include a security check. In other embodiments, the PCR0 value for the installed BIOS is obtained from a TPM (Trusted Platform Module) chip, shown at 130 in FIG. 1. More specifically, the TPM chip 130 is a secure cryptoprocessor for executing secure cryptographic operations such as taking a hash of the BIOS. Because it includes multiple physical security mechanisms to make it tamper resistant, the TPM chip is appropriate for system integrity measurements and for key creation and use. In this case, the BIOS firmware that is loaded during the boot process can be measured and recorded by the TPM chip and the measurements used as evidence for how the machine started. The integrity of the BIOS can be checked by confirming that a TPM-based key was used only when the correct software (e.g., BIOS firmware that has not been tampered with or compromised) was used to boot the system. However, because the process performed in FIG. 4 and/or step 210 of FIG. 2 is performed by a lightweight in-memory program, the PCR0 value believed to be obtained from the TPM chip cannot be authenticated due to additional resources being not accessible by the lightweight in-memory program. Thus the PCR0 value believed to be obtained from the TPM chip is initially trusted (e.g., trusted during the process performed in FIG. 4 and/or step 210 of FIG. 2) and later the authenticity of the PCR0 value is validated during remote attestation (e.g., in step 226 of FIG. 2).

The PCR0 value for the installed BIOS can be written to the TPM chip 130, and the golden hash value can be stored in a database, such as Central Database 140 of FIG. 1, for later access. As shown in FIG. 2, in response to determining that the PCR0 value for the installed BIOS matches the golden value (resulting in a determination that the installed firmware matches the reference firmware at 222), the process 200 provisions the machine at 224 and performs remote attestation at 226.

In some embodiments, determining whether the installed firmware matches the reference firmware at 210 includes checking to see whether the PCR0 value for the installed BIOS matches the golden hash value obtained from the database. For example, only the static configuration of the BIOS is hashed to generate the PCR0 value and this PCR0 value is obtained for comparison with the golden hash value. If the PCR0 value for the installed BIOS matches the golden hash value obtained from the database, the installed firmware is determined to match the reference firmware at 222 and the process proceeds as described with respect to FIG. 2 by provisioning the machine at 224 and performing remote attestation at 226. If the PCR0 value for the installed BIOS does not match the golden hash value obtained from the database, the installed firmware is determined not to match the reference firmware at 228 and the process proceeds as described with respect to FIG. 2 by extracting different types of content sections of the installed firmware at 230 and comparing a portion of the installed firmware with a corresponding portion of the reference firmware to determine a comparison result at 235, performing a security action at 240, re-flashing the installed firmware at 250, provisioning the machine at 224, and performing remote attestation at 226.

In some embodiments, in order to distinguish between changes in the installed firmware that are innocuous and changes to the installed firmware that are indicative of possible attacks through malicious modifications of the installed firmware's code, prior knowledge of the different types of content sections in the installed firmware is used to filter out the dynamic sections of the installed firmware leaving only the static portion of the installed firmware corresponding to its code. The presumption is that the static portion of the installed firmware corresponding to its code should not change in any appreciable way unless it has been tampered with or compromised. Accordingly, the technique seeks to detect only the changes to the code of the installed firmware while ignoring changes to the dynamic sections that represent data settings and configurations. Focusing on the changes detected in the code will minimize false positives or false alarms that are the result of interpreting innocuous changes in the data settings as harmful. Here, only the static portion of the installed firmware is compared to the corresponding static portion of the reference firmware, with the reference firmware serving as a benchmark for comparison. The magnitude of the difference between the static portions of the installed firmware and the reference firmware provides a metric for identifying cases of installed firmware (e.g., bad BIOSs) that might have been subject to malicious modifications and should be reported.

Figure 5:
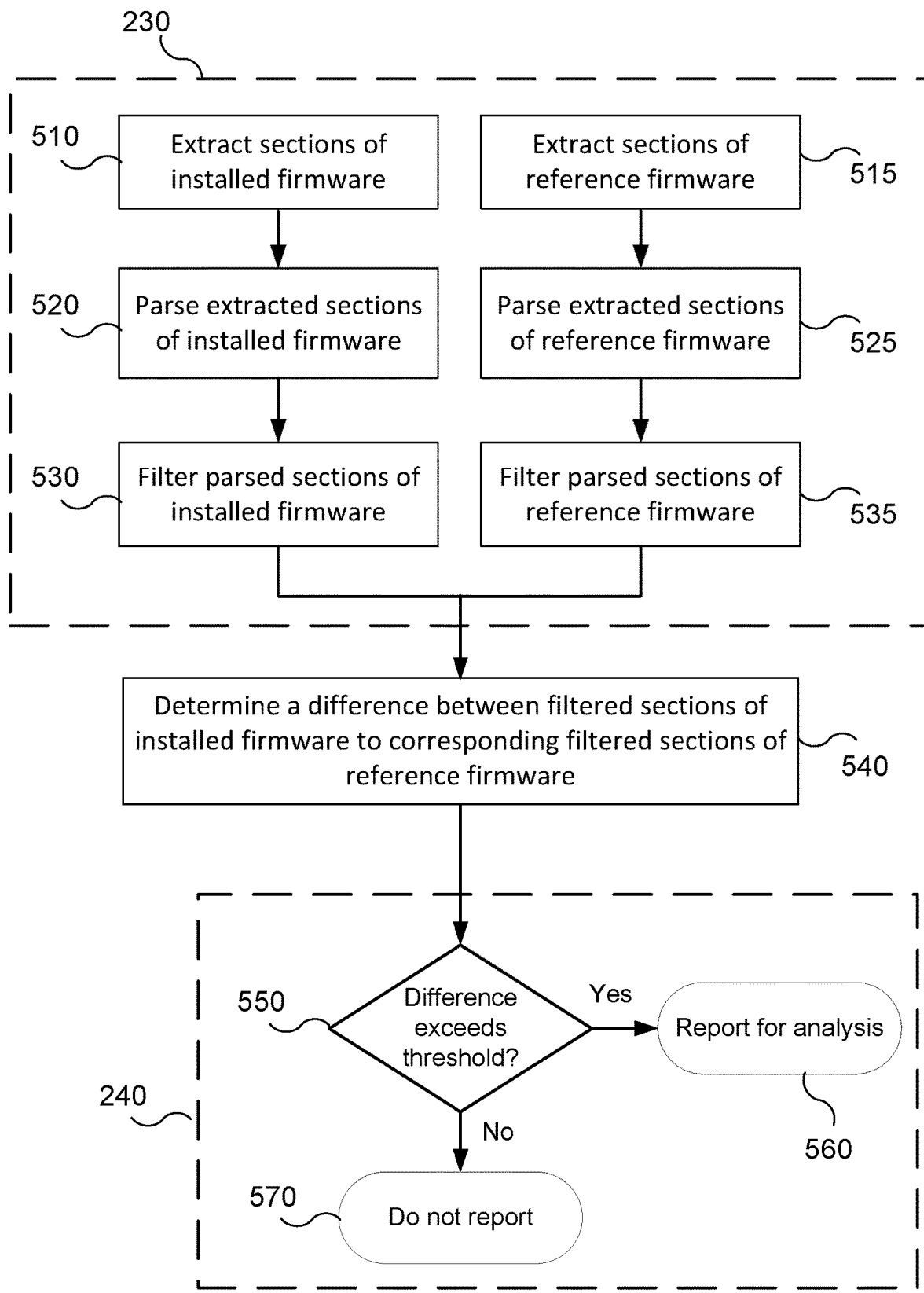
FIG. 5 is a flowchart depicting details of an exemplary process to distinguish between changes in the installed firmware that are innocuous and changes to the installed firmware that are indicative of possible attacks through malicious modifications of the installed firmware's code.

FIG. 5 is a flowchart depicting further details of a process to distinguish between changes in the installed firmware that are innocuous and changes to the installed firmware that are indicative of possible attacks through malicious modifications of the installed firmware's code. In particular, FIG. 5 illustrates additional steps in an exemplary embodiment of process 230 of FIG. 2 to extract different types of content sections of the installed firmware of the device in response to a determination that the installed firmware of the device does not match the reference firmware for the device at 228. The process 230 may be performed by code on disk or in the initial in-memory operating system on the machine being provisioned or may be performed remotely using a service or through a remote server such as Validation Server 160 connected via Network 150 to the Machine being provisioned 110, as shown in FIG. 1.

In some embodiments, the process 230 extracts different types of content sections of the installed firmware of the machine at 510. At least one of the extracted content sections is identified as a dynamic section, which corresponds to data settings that are configurable and can change over time. After the sections of the installed firmware are extracted at 510, they are parsed at 520 in order to identify and separate the dynamic from the static sections. The dynamic sections of the installed firmware are filtered out by a filtering process at 530 in order to isolate and retain only the static sections of the installed firmware corresponding to its code. Similarly, sections of the reference firmware are extracted at 515 and parsed at 525 in order to identify and separate the dynamic from the static sections of the reference firmware. The dynamic sections of the reference firmware are filtered out by a filtering process at 535 to isolate and retain only the static sections of the reference firmware corresponding to its code. In this manner, a difference is determined at 540 that represents a measure of how much the code section of the installed firmware has changed with respect to the code section of the reference firmware, effectively ignoring any differences in the dynamic sections which are innocuous and not indicative of malicious activity.

In some embodiments, the installed firmware is installed in a flash ROM of the machine being provisioned and the process 230 of FIG. 4 includes extracting a current image of the installed firmware from a flash ROM of the machine being provisioned. Different types of content sections of the installed firmware can subsequently be extracted at 510 from the current image of the installed firmware extracted from the flash ROM of the machine being provisioned.

In some embodiments, the process 230 obtains a reference copy of a previously extracted image of the installed firmware. This reference copy corresponds to an image of the installed firmware having a valid hash value, such as a golden BIOS provided by the manufacturer of the BIOS, and serves as a benchmark (i.e., the reference firmware) for comparison. The process compares a portion of the installed firmware selected to exclude at least the dynamic section with a corresponding portion of the reference firmware. In this example, a portion of the current extracted image of the installed firmware that was extracted from the flash ROM of the machine provisioned is compared to a corresponding portion of the reference copy or golden BIOS.

In some embodiments, the current extracted image of the installed firmware is put on a disk file and the current extracted image on the disk file is locally compared to the reference copy or golden BIOS on the machine being provisioned. The comparison may be performed by code in the initial in-memory operating system on the machine being provisioned. In some cases, the reference copy or golden BIOS is obtained from a cloud service (not shown). Alternatively, instead of putting the current extracted image on a disk file and locally comparing that image to the reference copy on the machine being provisioned, the current extracted image of the installed firmware can be put or uploaded to another device or machine different from the machine being provisioned and the comparison can be performed on the other device or machine. In some embodiments, the process of comparing the current extracted image of the installed firmware to a corresponding portion of the reference copy or golden BIOS is performed remotely, by passing values back and forth from a remote analysis server such as Validation Server 160 of FIG. 1.

To limit the number of false positives, the technique focuses on detecting changes to the non-dynamic or static code sections, because changes to the dynamic data settings and configurations are expected and are likely not indicative of tampering of the code. The parsing and filtering steps of FIG. 5 are applied to each of the installed firmware at 520 and 530 and the reference firmware at 525 and 535 respectively in order to select a portion that excludes at least the dynamic section of each of the installed firmware and the reference firmware in order to determine a difference at 540. The difference determined at 540 thus represents a difference in the code of the installed firmware.

In some embodiments, a portion of the installed firmware selected to exclude at least the dynamic section is obtained by parsing the current extracted image of the installed firmware into sections or raw bytes at 520. These sections or raw bytes of the current extracted image are identified as corresponding to different types of content sections of the installed firmware including the dynamic section. The parsing step at 520 is followed by filtering the sections or raw bytes of the current extracted image at 530 to exclude the sections or raw bytes of the current extracted image that correspond to the dynamic section, leaving only the sections or raw bytes of the current extracted image that correspond to a non-dynamic or static section.

The corresponding portion of the reference firmware which forms the basis for comparison is obtained in a similar manner, namely, by parsing the reference copy of the previously extracted image of the installed firmware into sections or raw bytes at 525, wherein the sections or raw bytes of the reference copy are identified as corresponding to different types of content sections of the installed firmware including the dynamic section. This parsing step is followed by filtering the sections or raw bytes of the reference copy at 535 to exclude the sections or raw bytes of the reference copy that correspond to the dynamic section, leaving only the sections or raw bytes of the reference copy that correspond to a non-dynamic or static section. The parsing steps can be performed by a firmware parser, which can be any parser that understands the data format of binary images extracted from the installed firmware or BIOS and can parse the binary images into sections or raw bytes that can be identified as different types of content sections.

Because we are interested in detecting changes to the non-dynamic or static sections, the process compares a portion of the installed firmware selected to exclude at least the dynamic section with a corresponding portion of a reference firmware to determine a difference at 540. In some embodiments, the parsing and filtering steps applied to each of the current extracted images of the installed firmware and the reference copy of the previously extracted image of the installed firmware result in the generation of filtered sections or raw bytes of the current extracted image that can be compared to corresponding sections or filtered raw bytes of the reference copy. Comparing the filtered sections or raw bytes of the current extracted image of the installed firmware to the corresponding filtered sections or raw bytes of the reference copy or reference firmware can comprise determining a difference between the filtered sections or raw bytes of the current extracted image of the installed firmware and the filtered sections or raw bytes of the reference copy or reference firmware. This difference is obtained by performing a bit-to-bit or byte-to-byte comparison of the filtered sections or raw bytes of the current extracted image of the installed firmware and the corresponding filtered sections or raw bytes of the reference copy of the previously extracted image of the installed firmware (i.e. the reference firmware). In this manner, the process counts the number of bits or bytes that differ between the filtered sections or raw bytes of the current extracted image of the installed firmware and the corresponding filtered sections or raw bytes of the reference copy of the previously extracted image of the installed firmware.

Note that the parsing and filtering steps ensure that the bit-to-bit or byte-to-byte comparisons are performed only on the code sections of the installed firmware and the reference firmware. In other words, by first parsing the each of the installed firmware and the reference firmware into different content sections, the process can filter out the dynamic content sections corresponding to data settings that are expected to change leaving only the non-dynamic or static content sections corresponding to the code as a basis for comparison. Thus, the difference obtained at 540 of FIG. 5 is a count of the bits that differ in the code between the installed firmware and the reference firmware.

Parsing the firmware to separate it into different types of sections and filtering the parsed firmware to exclude at least the dynamic sections can be performed on the machine being provisioned (e.g., Machine 110 of FIG. 1). Alternatively, in some embodiments, parsing and filtering is performed remotely, by a remote service or by a firmware parser on a remote server such as Validation Server 160 of FIG. 1 connected to the machine being provisioned via a network.

Comparing a portion of the installed firmware selected to exclude at least the dynamic section with a corresponding portion of the reference firmware to determine a comparison result can include comparing a raw byte section corresponding to the portion of the installed firmware selected to exclude at least the dynamic section with a reference raw byte section corresponding to the portion of the reference firmware. In some examples, as shown in FIG. 5, comparing a portion of the installed firmware with a corresponding portion of the reference firmware includes determining a difference between filtered sections of the installed firmware to corresponding filtered sections of the reference firmware at 540. In some embodiments, determining a comparison result includes determining a magnitude of difference between the portion of the installed firmware selected to exclude at least the dynamic section and the corresponding portion of the reference firmware.

FIG. 5 also depicts additional steps in an exemplary embodiment of process 240 of FIG. 1 to perform a security action based at least in part on the comparison result determined at 235. The process 240 may be performed by code in the initial in-memory operating system on the machine being provisioned or may be performed remotely using a service or through a remote server such as Validation Server 160 connected via Network 150 to the Machine being provisioned 110, as shown in FIG. 1.

In some embodiments, the process 240 performs a security action by determining whether the comparison result exceeds a threshold value. For example, the security action can be performed in response to a determination that the magnitude of difference exceeds a threshold. The threshold value can be a non-zero value and in response to a determination that the comparison result does not exceed the threshold value, the process 240 will not report the installed firmware for further analysis. Alternatively, in response to a determination that the comparison result does exceed the threshold value, the process 240 will report the installed firmware for further analysis. Additionally, performing a security action at 240 can include replacing the installed firmware with the reference firmware.

FIG. 5 shows that performing a security action based at least in part on the comparison result can include reporting the installed firmware for further analysis at 560 or not reporting the installed firmware at 570 in response to determining whether the magnitude of the difference obtained at 540 of FIG. 5 exceeds a threshold (e.g., threshold number of bits/bytes). In the example of FIG. 5, if the difference between the filtered sections of the installed firmware and the corresponding filtered sections of the reference firmware determined at 540 exceeds a threshold at 550, the process reports the installed firmware for further analysis or investigation at step 560. In the case where the installed firmware is a BIOS, the process uploads or stores the BIOS for analysis including a deeper, manual analysis by a BIOS security expert and indicates that further investigation is required to determine whether the difference detected in the code of the BIOS is indicative of tampering. If on the other hand, the difference determined at 540 does not exceed the threshold at 550, no report is made as indicated in step 570.

Regardless of whether the difference is determined to exceed or not exceed the threshold at 550, the process will proceed to re-flash the installed software at step 250 of FIG. 2 (if the initial validation check fails at 228) and will provision the machine at 224 and perform remote attestation at 226.

The threshold provides an ability to adjust or fine-tune the sensitivity of the triaging of BIOS reporting and can be set to any number of bits or bytes. A lower threshold will tolerate less of a difference between the code (static sections) of the installed firmware and the code (static sections) of the reference firmware. For example, setting the threshold to zero bits will tolerate no difference between the code of the installed firmware and the code of the reference firmware, so that even a difference of one bit will result in a security action such as reporting the installed firmware for further analysis and investigation. A zero bit threshold thus ensures that no difference will be tolerated and minimizes the false negatives (i.e., the missed detections of a bad BIOS) which increases the sensitivity of the triaging. However, there is a trade-off in that lowering the threshold increases the false positives (i.e., false alarms, which in this case are determinations that the change is due to a malicious modification when in fact the change is innocuous). In the case of a zero threshold, a change of one or two bits due to random bit flipping would result in a security action and would increase the false positives. Setting the threshold to a small value, such as one or two bits, might result in a better trade-off between false alarms and missed detections by tolerating the case of random bit-flipping while setting a threshold low enough to detect any meaningful change in the code of the installed firmware that would be indicative of a malicious attack.

The process is not limited to only one instance of the firmware, BIOS, or UEFI but can include a set of valid hash values corresponding to a set of reference firmwares. In this case, the golden hash value corresponding to the hash of the reference firmware is one of a plurality of golden hash values that can be stored in Central Database 140 of FIG. 1. Additionally, the reference firmware is one of a plurality of reference firmwares and each of the plurality of golden hash values corresponds to a hash of one of the plurality of reference firmwares.

The technique described herein for detecting malicious firmware modification exploits prior knowledge of the file format of the installed firmware and prior knowledge of where the tampering of the code is likely to have taken place in the installed firmware. Specifically, the disclosed method and system takes advantage of knowing that the non-dynamic or static sections correspond to the code of the installed firmware and that any changes in the dynamic sections corresponding to data settings are to be expected and are unlikely to indicate tampering. The technique also makes use of access to a valid or golden hash value—a signature corresponding to a clean, uncorrupted, version of the installed firmware that provides a benchmark for comparison.

An alternative method for detecting malicious firmware modification that would not require prior knowledge of the file format of the installed firmware can be used in the case where a sufficient volume of data is obtained that represents samples of clean, uncompromised, instances of the installed firmware, BIOSs, or UEFIs. In this case, if enough data is available, on the order of hundreds of samples of good BIOSs for example, a firmware parser may be used to extract the binary images of each sample of good firmware and parse each of the binary images into raw bytes for each sample of good firmware. The raw bytes for each of the samples can be used to train a system using machine learning techniques to determine what parts of the sample always change (corresponding to data settings) and what parts do not change (corresponding to code). The trained system can then be used to determine or predict whether the installed firmware deviates from the samples in a meaningful way (e.g., corresponding to changes in the code) indicating possible tampering of the code of the installed firmware. In response to determining that the installed firmware does not match the good samples but deviates in a meaningful way, the installed firmware can be uploaded and a security action performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
  determine whether an installed firmware of a device matches a reference firmware for the device;
  in response to a determination that the installed firmware of the device does not match the reference firmware for the device, extract different types of content sections of the installed firmware of the device, wherein at least one of the content sections is identified as a dynamic section including by being configured to parse the installed firmware into different sections of raw bytes corresponding to the different types of content sections;
  compare a portion of the installed firmware selected to exclude at least the dynamic section with a corresponding portion of the reference firmware to determine a comparison result including by being configured to compare a raw byte section corresponding to the portion of the installed firmware selected to exclude at least the dynamic section with a reference raw byte section corresponding to the corresponding portion of the reference firmware; and
  perform a security action based at least in part on the comparison result including by being configured to allow an amount of hardware based random bit flip errors without triggering a reporting of a detected difference between the installed firmware and the reference firmware by being configured to determine whether the comparison result exceeds a threshold value; and
a memory coupled to the processor and configured to provide the processor with instructions.

2. The system of claim 1, wherein the processor is further configured to determine whether the installed firmware of the device matches the reference firmware for the device including by being configured to compare a signature of the installed firmware with a signature of the reference firmware.

3. The system of claim 2, wherein the signature of the installed firmware is a hash of the installed firmware and the reference signature is a reference hash value of the reference firmware.

4. The system of claim 3, wherein the reference hash value was obtained from a remote data structure that stores a plurality of different reference hash values corresponding to different reference firmwares.

5. The system of claim 3, wherein the installed firmware is an installed BIOS and the hash of the installed firmware is obtained using a PCR0 value for the installed BIOS.

6. The system of claim 1, wherein the processor is further configured to extract a current copy of the installed firmware from a memory chip of the device.

7. The system of claim 1, wherein the processor is further configured to obtain a reference copy of the reference firmware via a network from a remote source.

8. The system of claim 1, wherein the dynamic section includes data corresponding to configurable firmware settings.

9. The system of claim 1, wherein the dynamic section includes data identified to change over time and the dynamic section is at least in part identified using a machine learning result.

10. The system of claim 1, wherein the portion of the installed firmware selected to exclude at least the dynamic section corresponds to instruction code included in the installed firmware identified as a static section of the installed firmware.

11. The system of claim 1, wherein the processor is configured to determine the comparison result including by being configured to determine a magnitude of difference between the portion of the installed firmware selected to exclude at least the dynamic section and the corresponding portion of the reference firmware.

12. The system of claim 11, wherein the security action is performed in response to a determination that the magnitude of difference exceeds the threshold vale.

13. The system of claim 12, wherein the threshold value is associated with allowing one or two bits of changes to reduce false positive detections.

14. The system of claim 13, wherein the threshold value is not a zero value and the processor is further configured to, in response to a determination that the comparison result does not exceed the threshold value, determine not to report the installed firmware for further analysis.

15. The system of claim 13, wherein the processor is further configured to, in response to a determination that the comparison result does exceed the threshold value, report the installed firmware for further analysis.

16. The system of claim 1, wherein the processor is configured to perform the security action including by being configured to replace the installed firmware with the reference firmware.

17. The system of claim 1, wherein the processor is further configured to perform remote attestation of a signature of the installed firmware.

18. A method comprising:
determining whether an installed firmware of a device matches a reference firmware for the device;
in response to a determination that the installed firmware of the device does not match the reference firmware for the device, extracting different types of content sections of the installed firmware of the device, wherein at least one of the content sections is identified as a dynamic section including by parsing the installed firmware into different sections of raw bytes corresponding to the different types of content sections;
comparing a portion of the installed firmware selected to exclude at least the dynamic section with a corresponding portion of the reference firmware to determine a comparison result including by comparing a raw byte section corresponding to the portion of the installed firmware selected to exclude at least the dynamic section with a reference raw byte section corresponding to the corresponding portion of the reference firmware; and performing a security action based at least in part on the comparison result including by allowing an amount of hardware based random bit flip errors without triggering a reporting of a detected difference between the installed firmware and the reference firmware by determining whether the comparison result exceeds a threshold value.

19. The method of claim 18, determining whether the installed firmware of the device matches the reference firmware for the device includes comparing a signature of the installed firmware with a signature of the reference firmware.

20. A computer program product, the computer program product being embodied in a non-transitory computer readable storage medium and comprising computer instructions for:

determining whether an installed firmware of a device matches a reference firmware for the device;

in response to a determination that the installed firmware of the device does not match the reference firmware for the device, extracting different types of content sections of the installed firmware of the device, wherein at least one of the content sections is identified as a dynamic section including by parsing the installed firmware into different sections of raw bytes corresponding to the different types of content sections;

comparing a portion of the installed firmware selected to exclude at least the dynamic section with a corresponding portion of the reference firmware to determine a comparison result including by comparing a raw byte section corresponding to the portion of the installed firmware selected to exclude at least the dynamic section with a reference raw byte section corresponding to the corresponding portion of the reference firmware; and performing a security action based at least in part on the comparison result including by allowing an amount of hardware based random bit flip errors without triggering a reporting of a detected difference between the installed firmware and the reference firmware by determining whether the comparison result exceeds a threshold value.

* * * * *